(12) United States Patent
Takeo

(10) Patent No.: US 6,813,393 B2
(45) Date of Patent: *Nov. 2, 2004

(54) IMAGE STORING METHOD AND IMAGE OUTPUT SYSTEM

(75) Inventor: Hideya Takeo, Kanagawa-ken (JP)

(73) Assignee: Fuji Photo Film Co., Ltd., Kanagawa-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,930

(22) Filed: Jan. 28, 1999

(65) Prior Publication Data

US 2002/0126916 A1 Sep. 12, 2002

(30) Foreign Application Priority Data

Jan. 30, 1998 (JP) .......................................... 10-019072

(51) Int. Cl.[7] ................................................ G06U 9/32
(52) U.S. Cl. ........................ 382/299; 382/128; 382/254
(58) Field of Search ................................. 382/299, 128, 382/131, 132, 254, 305

(56) References Cited

U.S. PATENT DOCUMENTS

| | | | | |
|---|---|---|---|---|
| 4,334,244 A | * | 6/1982 | Chan et al. ................. | 348/606 |
| 5,086,392 A | * | 2/1992 | Nakajima ................... | 340/716 |
| 5,111,044 A | * | 5/1992 | Agano ........................ | 250/584 |
| 5,123,054 A | * | 6/1992 | Hara et al. ................. | 382/130 |
| 5,144,687 A | * | 9/1992 | Honda ........................ | 382/261 |
| 5,189,511 A | * | 2/1993 | Parulski et al. ............ | 358/518 |
| 5,321,520 A | * | 6/1994 | Inga et al. ................. | 358/403 |
| 5,436,734 A | * | 7/1995 | Yamauchi et al. .......... | 358/448 |
| 5,490,197 A | * | 2/1996 | Albert et al. ............... | 378/113 |
| 5,508,746 A | * | 4/1996 | Lim ............................. | 381/2 |
| 5,600,574 A | * | 2/1997 | Reitan ........................ | 364/552 |
| 5,621,660 A | * | 4/1997 | Chaddha et al. ........... | 709/247 |
| 5,657,402 A | * | 8/1997 | Bender et al. .............. | 382/284 |
| 5,666,163 A | * | 9/1997 | Lee et al. ................... | 348/441 |
| 5,694,484 A | * | 12/1997 | Cottrell et al. ............. | 382/167 |
| 5,742,343 A | * | 4/1998 | Haskell et al. ............. | 348/487 |
| 5,832,136 A | * | 11/1998 | Hirose ........................ | 382/275 |
| 5,845,057 A | * | 12/1998 | Takeda et al. ............. | 358/1.15 |
| 5,883,985 A | * | 3/1999 | Pourjavid ................... | 382/300 |
| 5,953,500 A | * | 9/1999 | Katakura .................... | 395/101 |
| 5,987,345 A | * | 11/1999 | Engelmann et al. ....... | 600/407 |

* cited by examiner

Primary Examiner—Bhavesh M. Mehta
Assistant Examiner—Sheela Chawan
(74) Attorney, Agent, or Firm—Sughrue Mion, PLLC

(57) ABSTRACT

In an image storing method for storing image signals, which represent images, in a storage device, a plurality of image signals, which represent a single image and have been subjected to different processes with respect to at least both of resolution altering processing and image processing, are stored in the storage device. In a network comprising a plurality of image output devices having different levels of image displaying quality according to purposes for which the displayed images are used, the image signals having been read from the storage device are capable of being quickly transferred or outputted according to purposes for which the displayed images are used.

9 Claims, 3 Drawing Sheets

| | RESOLUTION | IMAGE PROCESSING | NUMBER OF BITS | COMPRESSION | APPLICATION |
|---|---|---|---|---|---|
| FIG. 3A | ORIGINAL IMAGE | NOT PROCESSED | 10 | COMPRESSED | DIAGNOSIS TERMINAL (HARD PC-HIC) 2,000-LINE CRT |
| FIG. 3B | 1/4 REDUCTION | NOT PROCESSED | 10 | COMPRESSED | LOW-COST DIAGNOSIS TERMINAL (HARD PC-HIC) 1,000-LINE CRT |
| FIG. 3C | 1/4 REDUCTION | PROCESSED | 8 | COMPRESSED | REFERENCE TERMINAL |
| FIG. 3D | THUMBNAIL 1/16 REDUCTION | NOT PROCESSED | 8 | NOT COMPRESSED | FOR DIAGNOSIS TERMINAL IMAGE RETRIEVAL |
| FIG. 3E | THUMBNAIL 1/16 REDUCTION | PROCESSED | 8 | NOT COMPRESSED | FOR REFERENCE TERMINAL IMAGE RETRIEVAL |

IMAGE STORING METHOD AND IMAGE OUTPUT SYSTEM

BACKGROUND OF THE INVENTION

1. Field of the Invention

This invention relates to an image storing method for storing image signals in a storage device. This invention also relates to an image output system for reproducing images in a medical network system, or the like, in which the image storing method is employed.

2. Description of the Prior Art

Various image forming apparatuses (modalities) for diagnosis, in which X-rays, or the like, are utilized, have heretofore been used in the medical field. As such modalities, computed radiography (CR) apparatuses, computed tomography (CT) scanners, magnetic resonance imaging (MRI) apparatuses, and the like, have been used in practice. An image having been formed by each modality is displayed on a cathode ray tube (CRT) display device or is reproduced on film by a laser printer (LP), or the like. The reproduced image is utilized for making a diagnosis, e.g. for investigating the presence or absence of a diseased part or an injury or for ascertaining the characteristics of the diseased part or the injury.

The CR apparatuses are radiation image recording and read-out apparatuses. With the radiation image recording and read-out apparatuses, a radiation image of an object, such as a human body, is recorded on a sheet provided with a layer of a stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. Recently, the CR apparatuses are widely used in practice.

With the rapid advances made in communication technology and computer technology in recent years, medical network systems (hereinbelow referred to simply as the "networks") utilizing computers have been built in hospitals. The aforesaid modalities, which were used in the past as stand-alone apparatuses, constitute part of the network as image information input apparatuses. Also, CRT display devices and LP's constitute part of the network as image output devices. Typical examples of the image output devices, which are to be connected to the network, include various kinds of soft copy terminals having image output quality according to the purposes for which the images are used, such as diagnosis terminals provided with CRT display devices having resolution of 2,000 TV lines, low-cost diagnosis terminals provided with CRT display devices having resolution of 1,000 TV lines, reference terminals having output quality lower than the output quality of the low-cost diagnosis terminals, and retrieval terminals for the above-enumerated terminals. Besides the soft copy terminals, hard copy devices, such as LP's, are often connected to the network.

Ordinarily, besides the image input apparatuses and the image output devices described above, the network is also provided with a storage device for storing pieces of image information, which are received from the image input apparatuses, in the form of the original image signals or signals, which have been compressed in a predetermined format, on optical disks, or the like. In accordance with the purposes for which the images are used, various kinds of the image output devices read the image signals from the storage device, carry out predetermined image processing on the image signals, and reproduce visible images from the processed image signals.

As described above, with the conventional displaying technique, pieces of image information are stored in the form of the original image signals (or the compressed image signals). Also, in every case where an image is to be displayed on one of the terminals, the corresponding original image signal (or the corresponding compressed image signal) is read from the storage device, predetermined image processing is carried out on the image signal by each terminal, and a visible image is reproduced from the processed image signal and displayed on the terminal. However, with the conventional displaying technique, for example, in both the cases wherein a medium resolution image for diagnosis is to be displayed on a low-cost diagnosis terminal provided with a CRT display device having resolution of 1,000 TV lines, and the cases wherein a retrieval image is to be displayed on a retrieval terminal, when the image signal is read from the storage device into the low-cost diagnosis terminal and the retrieval terminal, the same length of time as that required for the diagnosis terminal provided with a CRT display device having resolution of 2,000 TV lines to read the image signal for the displaying of a high resolution image is required at the low-cost diagnosis terminal and the retrieval terminal. Also, it is necessary for the low-cost diagnosis terminal to carry out predetermined image processing for the low-cost diagnosis terminal on the received image signal, and it is necessary for the retrieval terminal to carry out predetermined image processing for the reference terminal on the received image signal. However, long time is required to carry out the image processing. Therefore, at both the low-cost diagnosis terminal and the retrieval terminal, considerable time is required for a visible image to be displayed ultimately. In particular, as for the image output devices, such as the retrieval terminals, on which it is sufficient for a visible image having comparatively bad image quality to be displayed, the problems have heretofore been occurred in that unnecessarily long time is taken before the visible image is displayed.

Further, recently, image output systems, in which an internet Web browser using, for example, Internet Imaging Protocol (IIP) known in the field of personal computer networks, or the like, have heretofore been constructed. With the image output systems, image signals are stored in a Web server, an image signal is read from the Web server into an image display device, which is located at a remote site, and a visible image is reproduced from the received image signal and displayed on the image display device. In such cases, only one kind of image signals for high resolution images are stored in the Web server. Therefore, the problems occur in that, in cases where a high resolution image need not be displayed and it is sufficient for an image having comparatively bad image quality to be displayed, long time is required for the image to be displayed.

SUMMARY OF THE INVENTION

The primary object of the present invention is to provide an image storing method for storing image signals in a storage device such that, for example, in a network comprising a plurality of image output devices having different levels of image displaying quality according to purposes for which the displayed images are used, the image signals having been read from the storage device may be quickly transferred or outputted (displayed) according to purposes for which the displayed images are used.

Another object of the present invention is to provide an image output system, in which the image storing method is employed.

The present invention provides an image storing method for storing image signals, which represent images, in a storage device, wherein a plurality of image signals, which represent a single image and have been subjected to different processes with respect to at least both of resolution altering processing and image processing, are stored in the storage device.

As the storage device, one of storage devices for storing image signals on various kinds of storage media, such as optical disks, or one of various servers, such as Web servers known in the field of personal computer networks, may be employed.

The term "resolution altering processing" as used herein means the signal processing for lowering or enhancing the resolution. For example, the resolution altering processing may be the signal processing for lowering the resolution, such as ¼ reduction or thumbnail ¹⁄₁₆ reduction, or the signal processing for enhancing the resolution. The term "image processing" as used herein means the processing for altering the details of the image themselves, such as gradation processing, emphasis processing, or frequency processing. The term "image processing" does not embrace the processing for altering the form of the image, such as resolution altering processing, bit number altering processing for altering the number of bits of the signal, and compression processing for compressing the amount of the signal.

In the image storing method in accordance with the present invention, a plurality of image signals, which represent a single image and have been subjected to different processes with respect to at least both of the resolution altering processing and the image processing, are stored in the storage device. For example, in cases where two image signals are stored as the plurality of the image signals, the two image signals may be the ones, which have been subjected to different processes with respect to the resolution altering processing, such that the levels of the resolution of the two image signals may become different from each other, or such that the resolution of one of the two image signals may be kept the same as the resolution of the original image signal and the processing for altering the resolution may be carried out on only the other image signal, and which have been subjected to different processes with respect to the image processing, such that different kinds of image processing may be carried out on the two image signals, such that image processings of the same kind but with different processing characteristics may be carried out on the two image signals, or such that one of the two image signals may be kept the same as the original image signal and image processing may be carried out on only the other image signal. Therefore, for example, one of the image signals may be the original image signal, which has not been subjected to any processing with respect to the resolution and the image processing, and the other image signal may be the one, which has been subjected to the resolution altering processing and the image processing. Also, in cases where three or more image signals are stored as the plurality of the image signals, all of the image signals need not necessarily have the relationship described above, and at least two image signals among the plurality of the image signals may have the relationship described above. Besides the resolution altering processing and the image processing, the image signals may have even further been subjected to various other processings, such as the bit number altering processing and the compression processing.

The present invention also provides an image output system, comprising:

i) a storage device for storing image signals, and ii) a plurality of image output devices for reading the image signals from the storage device and reproducing images from the thus read image signals, the image output devices having different levels of output image quality, wherein a plurality of image signals, which represent a single image and have been subjected to different processes with respect to at least both of resolution altering processing and image processing, are stored in the storage device, each of the different processes corresponding to one of the image output devices, and each of the image output devices reads an image signal, which corresponds to the image output device, from the storage device and reproduces an image from the thus read image signal.

The image output system in accordance with the present invention is also applicable when the plurality of the image signals, which are to be stored in the storage device, have not been prepared previously. In such cases, the image output system should preferably be modified such that it may be provided with a processing unit for obtaining the plurality of the image signals, and the storage device may store the plurality of the image signals, which have been obtained from the processing unit.

The term "a plurality of image output devices having different levels of output image quality" as used herein means the image output devices having different levels of output quality in accordance with the purposes for which the images are used (in accordance with whether the output images are the images for diagnosis, the images for retrieval, or the like). For example, the image output devices may include various kinds of soft copy terminals having different levels of resolution, such as accurate diagnosis terminals, which are provided with CRT display devices having resolution of 2,000 TV lines and which can display high resolution images, low-cost diagnosis terminals for ordinary diagnosis, which are provided with CRT display devices having resolution of 1,000 TV lines and which can display medium resolution images, reference terminals having output quality lower than the output quality of the low-cost diagnosis terminals, and retrieval terminals for the above-enumerated terminals. Besides the soft copy terminals, hard copy devices, such as LP's, may be included in the image output devices. An image output device, which is capable of displaying a high resolution image, can also display a low resolution image. In such cases, a single image output device, which is capable of displaying a high resolution image, is equivalent to a plurality of image output devices and is therefore regarded as a plurality of image output devices. Also, the hard copy terminals described above have different levels of output quality with respect to the resolution. However, the hard copy terminals are not limited to such hard copy terminals and may have different levels of output quality with respect to other characteristics, such as contrast characteristics, in accordance with the purposes for which the images are used. This also applies to the soft copy terminals.

The term "a plurality of image signals having been subjected to different processes corresponding to image output devices" as used herein means the plurality of the image signals, which have been subjected to processes conforming to the output quality of the image output devices. For example, as one of the image signals, the original image signal, which has not been subjected to any processing with respect to the resolution and the image processing, may be assigned to an accurate diagnosis terminal, which is provided with a CRT display device having resolution of 2,000 TV lines and which can display a high resolution image. Also, an image signal, which has been subjected to the resolution altering processing for ½ reduction and the image processing with predetermined characteristics, may be assigned to a reference terminal.

With the image storing method and the image output system in accordance with the present invention, the plurality of the image signals, which represent a single image and have been subjected to different processes with respect to at least both of the resolution altering processing and the image processing, are stored in the storage device. Therefore, when each of the image output devices reads an image signal from the storage device and reproduces an image from the read image signal, the image output device can read a desired image signal from the plurality of the stored image signals and in accordance with the output quality (the difference in display resolution, whether the image processing is or is not necessary, or the like) of the image output device. Accordingly, as for the image output device other than the image output device for reproducing an image having good image quality by using the original image signal, the desired processed image signal may be read from the storage device into the image output device, and it is not necessary for the image output device to carry out the image processing. As a result, the image output device can reproduce the image more quickly than when the image output device reads the original image signal from the storage device, carries out the predetermined image processing on the original image signal, and then reproduces the image. Also, instead of the original image signal being read from the storage device, the image output device can read the image signal, which has been obtained by reducing the resolution and is composed of an amount of signal smaller than that of the original image signal, from the image output device. Therefore, the signal transfer speed can be kept high, and the time required for the image to be outputted can thereby be kept short.

DESCRIPTION OF THE PREFERRED EMBODIMENTS

The present invention will hereinbelow be described in further detail with reference to the accompanying drawings.

Figure 1:
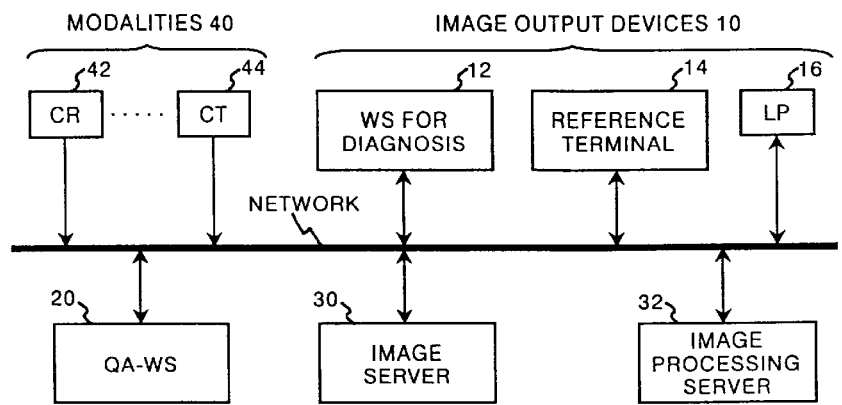
FIG. 1 is a conceptual view showing an embodiment of the image output system in accordance with the present invention.

FIG. 1 is a conceptual view showing an embodiment of the image output system in accordance with the present invention, in which the image storing method in accordance with the present invention is employed. With reference to FIG. 1, the image output system comprises various kinds of modalities 40 (a CR apparatus 42, a CT scanner 44, and the like) for obtaining images, and a plurality of image output devices 10 (a WS for diagnosis 12, a reference terminal 14, and an LP 16) having different levels of output image quality. The image output system also comprises a processing means (QA-WS 20) for carrying out predetermined signal processing on a single image, which has been obtained with one of the modalities 40, and thereby obtaining image signals for the image output devices 10. The image output system further comprises a storage device (an image server 30) for storing the image signals, which have been obtained from the QA-WS 20. The modalities 40, the image output devices 10, the QA-WS 20, and the image server 30 are connected to a network. The image output system still further comprises an image processing server 32, which is used when an image represented by an original image signal is to be directly reproduced by the LP 16. However, in this embodiment, the image processing server 32 need not necessarily be provided. The network may be, for example, a medical network system utilized in a hospital, or a personal computer network system utilizing an internet Web browser. The CR apparatus 42 may take on the form of the radiation image recording and read-out apparatus described above or, for example, a radiation image read-out apparatus alone, which can feed the ultimately detected image signal (i.e., image information) into the network.

The WS for diagnosis 12 is a diagnosis terminal appropriate for accurate diagnosis, which is provided with a CRT display device having resolution of 2,000 TV lines and which can display a high resolution image. The reference terminal 14 is a terminal (e.g., a personal computer PC provided with a CRT display device having resolution of 100 TV lines), which has output quality lower than the output quality of the WS for diagnosis 12 and has simple image processing functions.

Figure 2:
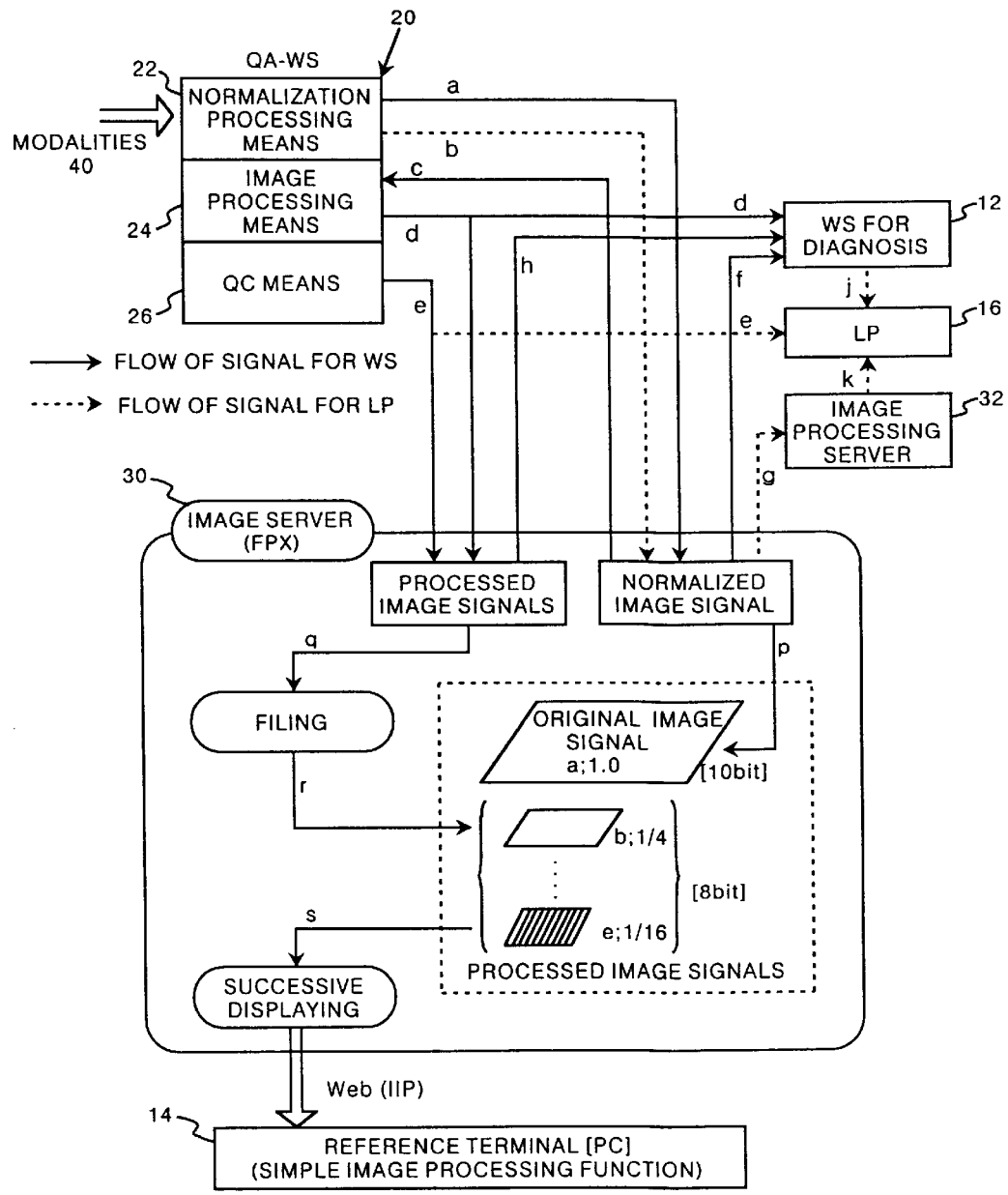
FIG. 2 is an explanatory view showing a flow of image signals in the embodiment of FIG. 1, and FIGS. 3A, 3B, 3C, 3D, and 3E are explanatory views showing examples of image signals stored in an image server.

As illustrated in FIG. 2, the QA-WS 20 comprises a normalization processing means 22 for carrying out normalization processing (EDR processing) on the image, which has been obtained with each of the modalities 40, and thereby obtaining a normalized image signal. The QA-WS 20 also comprises an image processing means 24 for carrying out signal processing with respect to resolution and predetermined image processing other than the signal processing with respect to resolution (as will be described later) on the normalized image signal (in the strict sense, the normalized image signal, which has been stored in the image server 30 and has then been read from the image server 30), and thereby obtaining processed image signals. The QA-WS 20 further comprises a QC means 26 for carrying out image quality adjustment processing on the processed image signals, and thereby obtaining QC image signals.

The LP 16 can reproduce an image from the QC image signal, which has been obtained from the QC means 26. The LP 16 can also reproduce the same image as that displayed at the WS for diagnosis 12 (the image having been obtained from each of the modalities 40, an image in which character information for diagnosis having been added by the WS for diagnosis 12 is embedded, or the like). The LP 16 can further reproduce the image from the normalized image signal, which is stored in the image server 30, via the image processing server 32.

The various devices and apparatuses, which are connected to the network carry out image signal input and output among them and carry out desired processing (e.g., the WS for diagnosis 12 carries out processing for reproducing the image having been obtained from the CR apparatus 42 as a high resolution image).

FIG. 2 is an explanatory view showing a flow of image signals in the embodiment of FIG. 1. How the image output system operates will be described hereinbelow with reference to FIG. 2.

The QA-WS 20 fetches the image signal representing the image, which has been obtained with each of the modalities 40, into the normalization processing means 22. The normalization processing means 22 carries out the normalization processing on the image, which has been obtained with each of the modalities 40. A 10-bit normalized image signal (corresponding to the original image signal) is thereby obtained and is stored in the image server 30 (as an original image signal "p" shown in the region surrounded by the broken lines in FIG. 2).

The image processing means 24 of the QA-WS 20 reads the normalized image signal, which is stored in the image server 30, and carries out the signal processing with respect to resolution and the image processing (e.g., gradation processing) other than the signal processing with respect to resolution on the normalized image signal. The processed image signals, which have thus been obtained from the processing, are stored in the image server 30. The QC means 26 of the QA-WS 20 carries out the image quality adjustment processing on the processed image signals, which have been obtained from the image processing means 24. The thus obtained QC image signals are stored in the image server 30.

FIG. 3A shows an example of an original image signal (a), which has been normalized by the normalization processing means 22. FIGS. 3B, 3C, 3D, and 3E show examples of processed image signals (b), (c), (d), and (e), which are obtained from the image processing means 24. The image signals (a), (b), (c), (d), and (e) are the image signals representing a single image, which has been obtained with one of the modalities 40.

The original image signal (a) is a compressed 10-bit image signal for the diagnosis terminal (in this embodiment, the WS for diagnosis 12), which image signal has not been subjected to any processing with respect to the resolution and the image processing.

The processed image signal (b) is a compressed 10-bit image signal for the low-cost diagnosis terminal, which image signal has been subjected to resolution lowering processing for ¼ reduction and has not been subjected to the image processing other than the resolution lowering processing. The processed image signal (c) is a compressed 8-bit image signal for the reference terminal 14, which image signal has been subjected to resolution lowering processing for ¼ reduction and has been subjected to the predetermined image processing (e.g., the gradation processing) other than the resolution lowering processing. The processed image signal (d) is an uncompressed 8-bit image signal for retrieval of images for the diagnosis terminal (in this embodiment, the WS for diagnosis 12), which image signal has been subjected to resolution lowering processing for thumbnail ¹⁄₁₆ reduction and has not been subjected to the image processing other than the resolution lowering processing. The processed image signal (e) is an uncompressed 8-bit image signal for retrieval of images for the reference terminal, which image signal has been subjected to resolution lowering processing for thumbnail ¹⁄₁₆ reduction and has been subjected to the predetermined image processing (e.g., the gradation processing) other than the resolution lowering processing. The signal compression may be carried out with one of various techniques. (Amount of signal: a>b>c>d>e)

The processed image signals (b), (c), (d), and (e) are filed in a single image file as a structured storage file (e.g., a file format according to a FlashPix file format based upon the FlashPix standard proposed by Eastman Kodak Co.). The thus obtained image file (processed image signals "r" shown in the region surrounded by the broken lines in FIG. 2) is stored in the image server 30.

In such cases, form information, which represents whether each of the processed image signals (b), (c), (d), and (e) is the compressed signal or the uncompressed signal, and other necessary information may be stored as attribute data independent from the image signal. When an image is to be reproduced, reference may be made to the attribute data.

With the WS for diagnosis 12, the reference terminal 14, or the like, an image is reproduced in the manner described below. Firstly, the image signal representing the image, which has been obtained with one of the modalities 40, is fetched into the normalization processing means 22. A 10-bit original image signal "a," which has been normalized by the normalization processing means 22, is stored in the image server 30. Thereafter, the image processing means 24 reads a normalized image signal "c" from the image server 30, and a processed image signal "d," which has been subjected to the signal processing with respect to resolution and the image processing (e.g., gradation processing) other than the signal processing with respect to resolution, is stored in the image server 30. Also, a QC image signal "e," which has been obtained from the QC means 26 by carrying out the image quality adjustment processing on the processed image signal, is stored in the image server 30.

In cases where a high resolution image for diagnosis is to be reproduced by the WS for diagnosis 12, the WS for diagnosis 12 reads an original image signal "f" from the image server 30 and reproduces an image from the original image signal "f." In cases where an image other than the high resolution image for diagnosis is to be reproduced by the WS for diagnosis 12 (e.g., at the time of image retrieval), instead of the processed image signal "d" [whose details are the same as those of the processed image signal (d) shown in FIG. 3D], which has been processed by the image processing means 24, being stored in the image server 30, the WS for diagnosis 12 receives the processed image signal "d" directly from the image processing means 24. Alternatively, the WS for diagnosis 12 may read a processed image signal "h" [whose details are the same as those of the processed image signal (d) shown in FIG. 3D] from the image server 30. The WS for diagnosis 12 can then quickly reproduce the retrieval image from the processed image signal "d" or "h."

In cases where a low resolution image for reference is to be reproduced by the reference terminal 14, the reference terminal 14 reads the processed image signal (c) from an image file "s," which is composed of the processed image signals (b), (c), (d), and (e) and is stored in the image server 30. The reference terminal 14 reproduces an image for reference from the thus read processed image signal (c). At the time of image retrieval, the reference terminal 14 successively reads the processed image signals (e), (e), . . . , which are contained in the image files "s," "s," . . . for the respective images, and can thereby quickly reproduce the retrieval images one after another from the processed image signals (e), (e), . . . .

In cases where an image is printed with the LP 16, the LP 16 reads an original image signal "g" from the image server 30, stores the original image signal "g" in the image processing server 32, and then prints an image in accordance with an original image signal "k." The LP 16 can also receive an image signal "j" from the WS for diagnosis 12 and can thereby output an image, to which character information for diagnosis, or the like, has been added by the WS for diagnosis 12. Further, the LP 16 can reproduce the image from the QC image signal "e" having been obtained from the QC means 26.

As described above, with the image storing method and the image output system in accordance with the present invention, the plurality of the image signals, which represent a single image and have been subjected to different processes with respect to at least both of the resolution altering processing and the image processing, are stored in the image server 30. Therefore, when each of the image output devices 10 reads an image signal from the image server 30 and reproduces an image from the read image signal, the image output device can read a desired image signal from the plurality of the stored image signals and in accordance with the output quality of the image output device. Accordingly, in cases where an image signal other than the original image signal may be utilized, the desired processed image signal may be read from the image server 30 into the image output device and used for reproducing an image. In this manner, the image output device can utilize the image signal composed of an amount of signal smaller than that of the original image signal. As a result, the signal transfer speed can be kept higher, and the image can be reproduced more quickly than when the image output device reads the original image signal from the image server 30, carries out the predetermined image processing on the original image signal, and then reproduces the image.

In the embodiment described above, the plurality of the image signals are composed of the five image signals (a), (b), (c), (d), and (e). However, in the image storing method and the image output system in accordance with the present invention, all of the five image signals need not necessarily be prepared. For example, the plurality of the image signals may be composed of the two image signals (a) and (c), the two image signals (a) and (e), or the two image signals (c) and (d). Thus all of the image signals need not necessarily have the relationship such that the image signals may have been subjected to different processes with respect to at least both of the resolution altering processing and the image processing. It is sufficient for at least two image signals among the plurality of the image signals to have the relationship described above.

What is claimed is:

1. An image storing method comprising:
   storing a plurality of image signals in a storage device, wherein each of the plurality of image signals represents an entire single image, at least one of the plurality of the image signals having been subjected to resolution altering processing and image processing; and
   enabling said stored image signals to be read from said storage device into a plurality of image output devices having different levels of output image quality.

2. An image output system, comprising:
   i) an image signal storage device; and
   ii) a plurality of image output devices for reading image signals from the image signal storage device and reproducing images from the read image signals, the image output devices having different levels of output image quality;
   wherein the image signal storage device stores a plurality of image signals, each of the plurality of image signals representing an entire single image, at least one of the plurality of the image signals having been subjected to resolution altering processing and image processing, each of said resolution altering and image processing corresponding to one of the image output devices; and
   each of the image output devices reads an image signal, which corresponds to the image output device, from the plurality of the image signals stored in the image signal storage device and reproduces an image from the read image signal.

3. An image output system as defined in claim 2, wherein the image output system further comprises a processing unit for obtaining the plurality of the image signals, and the image signal storage device stores the plurality of the image signals, which have been obtained from said processing unit.

4. An image storing method as defined in claim 1, wherein the resolution altering processing comprises lowering the resolution of the image signal or enhancing the resolution of the image signal.

5. An image storing method as defined in claim 1, wherein the image processing comprises gradation processing of the image signal.

6. An image storing method as claimed in claim 1, wherein another of the plurality of the image signals represents the single image and has not been subjected to the resolution altering processing and image processing.

7. An image output system as claimed in claim 2, wherein another of the plurality of the image signals represents the single image and has not been subjected to the resolution altering processing and image processing.

8. An image storing method as claimed in claim 2, wherein at least one of the plurality of the stored image signals has not been subject to resolution altering processing.

9. An image output system as claimed in claim 2, wherein at least a second of the plurality of image signals has been subjected to resolution altering processing and image processing corresponding to a second one of the image input devices.

* * * * *